No. 871,795.   
PATENTED NOV. 26, 1907.

G. GRANT & W. T. NEWTON.
SAWMILL LOG DOG.
APPLICATION FILED AUG. 30, 1907.

WITNESSES
Phil E. Barnes.
J. J. Sheehy Jr.

INVENTORS
George Grant &
William T. Newton.
by James J. Sheehy
Attorney

UNITED STATES PATENT OFFICE.

GEORGE GRANT AND WILLIAM T. NEWTON, OF NEW ORLEANS, LOUISIANA.

SAWMILL LOG-DOG.

No. 871,795.  Specification of Letters Patent.  Patented Nov. 26, 1907.

Application filed August 30, 1907. Serial No. 390,785.

*To all whom it may concern:*

Be it known that we, GEORGE GRANT and WILLIAM T. NEWTON, citizens of the United States, residing at New Orleans, in the parish of Orleans and State of Louisiana, have invented new and useful Improvements in Sawmill Log-Dogs, of which the following is a specification.

Our invention pertains to conveyers, and more particularly to dogs for use on conveyer belts to move various articles such, for instance, as logs in saw mills.

The invention is designed more particularly as an improvement upon the sawmill log dog constituting the subject of the Letters-Patent No. 838,506, granted to J. F. Lehrmann, Jr., under date of December 11, 1906, and it has for its object to provide a dog embodying such a construction that when necessity demands the pin or pins through the medium of which the dog body is connected to the belt may be expeditiously and easily removed and as readily replaced with a new pin or pins. In the ordinary practice the pin or pins mentioned are secured in position by riveting or upsetting the ends of the same, and consequently when it is necessary to remove the pin or pins, as when the dog body is to be connected to a new chain belt, the operation requires considerable of a blacksmith's time. By the employment of our invention, however, the pin or pins may be quickly displaced after the jaws are removed from the dog body, and in that way the dog may be readily connected with and disconnected from a chain belt, and this without the necessity of employing skilled labor.

Figure 1:
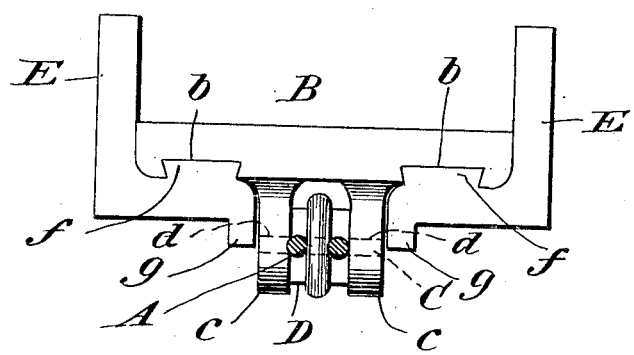
Figure 2:
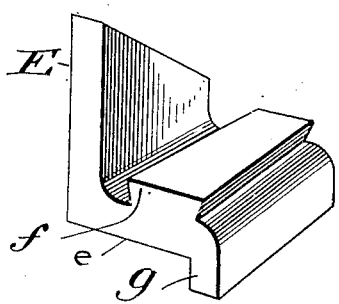
Figure 3:
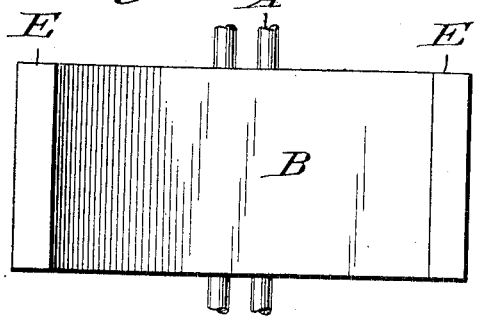
Figure 4:
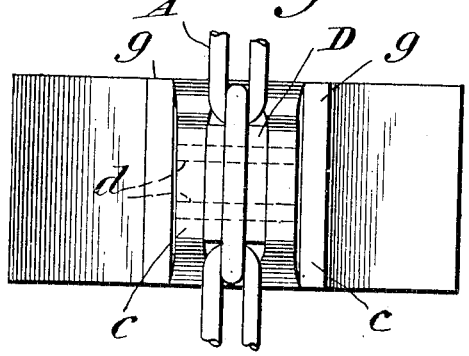
Figure 5:
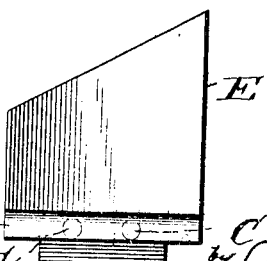

With the foregoing in mind, our invention will be fully understood from the following description and claims when the same are read in connection with the drawings, accompanying and forming part of this specification, in which:

Figure 1 is a view illustrating the dog constituting the best embodiment of our invention of which we are cognizant in front elevation and as properly connected to a chain belt. Fig. 2 is an enlarged perspective view of one of the jaws of the dog as said jaw appears when removed from the dog body. Fig. 3 is a plan view of the dog. Fig. 4 is an inverted plan showing both the dog and the chain belt to which the same is connected, and: Fig. 5 is a side elevation of the dog.

Similar letters designate corresponding parts in all of the views of the drawings, referring to which:

A is so much of a chain belt as is necessary to illustrate the application of our novel dog, and B is the body of the dog. The said body B is cast or otherwise formed of steel or other material compatible with the purpose of the invention, and is provided in its under side with two grooves $b$ disposed in the direction in which the body is designed to move and tapered or gradually reduced in width from their forward to their rear ends. The body is also provided with two parallel lugs $c$ disposed in the direction in which the body is to be moved, and in the said lugs are formed transverse apertures $d$ in which are arranged two (more or less) pins C. These pins C have for their office to connect the body B to one of the links of the chain A, and when deemed expedient a block D, shown by dotted lines in Fig. 1, may be arranged in the link to receive the pins.

In addition to the body B and the pin or pins C, our novel dog comprises jaws E, the upper edges of the upright portions of which are inclined downward and rearward as shown. These jaws have horizontal portions $e$ which extend inward from the vertical portions and are designed to be positioned below the major portion of the body B and at opposite sides of the depending lugs $c$. On the upper sides of the said horizontal portions $e$ longitudinally disposed, rearwardly tapered tongues $f$ are provided, while on the under side of said horizontal portions are formed depending enlargements $g$ which have for their function to close the outer ends of the transverse apertures $d$ in the lugs $c$ when the jaws E are arranged as shown relative to the body B, this with a view of precluding casual displacement of the pins C when the dog is in use.

In the practical use of our novel dog, the same is designed to be moved through the medium of a chain A and to move before it a log or any other article to be transported. When the dog is thus used it will be seen that the rearward taper of the grooves $b$ and tongues $f$ will preclude casual disengagement of the jaws E from the body B, and hence the depending enlargements $g$ of the jaws will, by closing the outer ends of the transverse apertures $d$, effectually prevent displacement of the pins C and disconnection of the dog from the chain belt A. When, however, it is desired for any reason to disconnect the dog from the chain belt A, the same may be expeditiously and easily accomplished by sliding the jaws E forward out of engagement with the body B so as to uncover the outer ends of the apertures d, and then driving the pins C out of the said apertures, when the dog may be readily lifted from the chain belt. By reversing the operation described—that is to say, by positioning the pins C in the apertures d and then sliding the jaws E into engagement with the body B, the dog may be as readily connected with a chain belt and this in such manner that casual disconnection of the dog from the chain belt is effectually prevented. It will be further gathered from the foregoing that when either of the jaws E is broken it may be readily removed and as readily replaced with a new jaw without impairment of the remainder of the dog; and it will further be gathered that the dog as a whole is simple and compact in construction and is well adapted to withstand the rough usage to which dogs of this kind are ordinarily subjected.

The construction herein illustrated and described constitutes the present embodiment of our invention known to us, but it is obvious that in the future practice of the invention such changes or modifications may be made as fairly fall within the scope of our invention as defined in the claims appended.

Having described our invention, what we claim and desire to secure by Letters-Patent, is:

1. A dog for the purpose described, comprising a body arranged to receive a pin for connecting the body to means for moving the body, the said pin removably arranged in the body, and means detachably connected with the body and arranged to prevent displacement of the pin from the body.

2. A dog for the purpose described, comprising a body arranged to receive a pin for connecting the body to means for moving the body, the said pin removably arranged in the body, and a jaw detachably connected with the body and arranged to prevent displacement of the pin from the body.

3. A dog for the purpose described, comprising a body arranged to receive a pin for connecting the body to means for moving the body, the said pin removably arranged in the body, and a jaw detachably connected through a coöperating, tapered tongue and groove, of dovetail form in cross-section, to the body and arranged to prevent displacement of the pin from the body.

4. A dog for the purpose described, comprising a body having a depending lug in which is a transverse aperture, a pin for connecting the body to means for moving the body, removably arranged in the said transverse aperture, and a jaw detachably connected with the body and having a portion arranged to close the end of the aperture and thereby prevent removal of the pin while the jaw is on the body.

5. A dog for the purpose described, comprising a body having a depending lug in which is a transverse aperture, and also having a groove of dovetail form in cross-section disposed in the direction in which the dog is to be moved and tapered toward the rear, a pin removably arranged in said aperture, and a detachable jaw having a rearwardly tapered tongue disposed in the groove of the body and also having a portion arranged to close the end of the aperture and thereby prevent removal of the pin while the jaw is on the body.

6. A dog for the purpose described, comprising a body having depending lugs in which are alined transverse apertures, and also having grooves of dovetail form in cross-section arranged at opposite sides of the lugs and disposed in the direction in which the dog is to be moved and tapered toward the rear, a pin removably arranged in the said transverse apertures of the lugs, and detachable jaws having rearwardly tapered tongues disposed in the grooves of the body and also having portions arranged at opposite sides of the lugs to close the ends of the apertures and thereby prevent removal of the pin while the jaws are on the body.

7. The herein described dog, comprising a body having depending lugs in which are alined transverse apertures and also having grooves of dovetail form in cross-section arranged at opposite sides of the lugs and disposed in the direction in which the dog is to be moved and tapered toward the rear, a pin removably arranged in the said transverse apertures of the lugs, and detachable jaws having upright portions arranged at the ends of the body and also having horizontal portions arranged under the body and equipped with rearwardly tapered tongues disposed in the grooves of the body and also equipped with depending enlargements arranged at opposite sides of the lugs to close the ends of the apertures and prevent removal of the pin while the jaws are on the body.

In testimony whereof we have hereunto set our hands in presence of two subscribing witnesses.

GEORGE GRANT.
WILLIAM T. NEWTON.

Witnesses:
 LOUIS F. BRYANT,
 GEO. W. KENDALL.